Aug. 25, 1964 T. N. KELLY 3,146,435
SYNCHRONIZATION INDICATOR
Filed Nov. 20, 1961 2 Sheets-Sheet 1
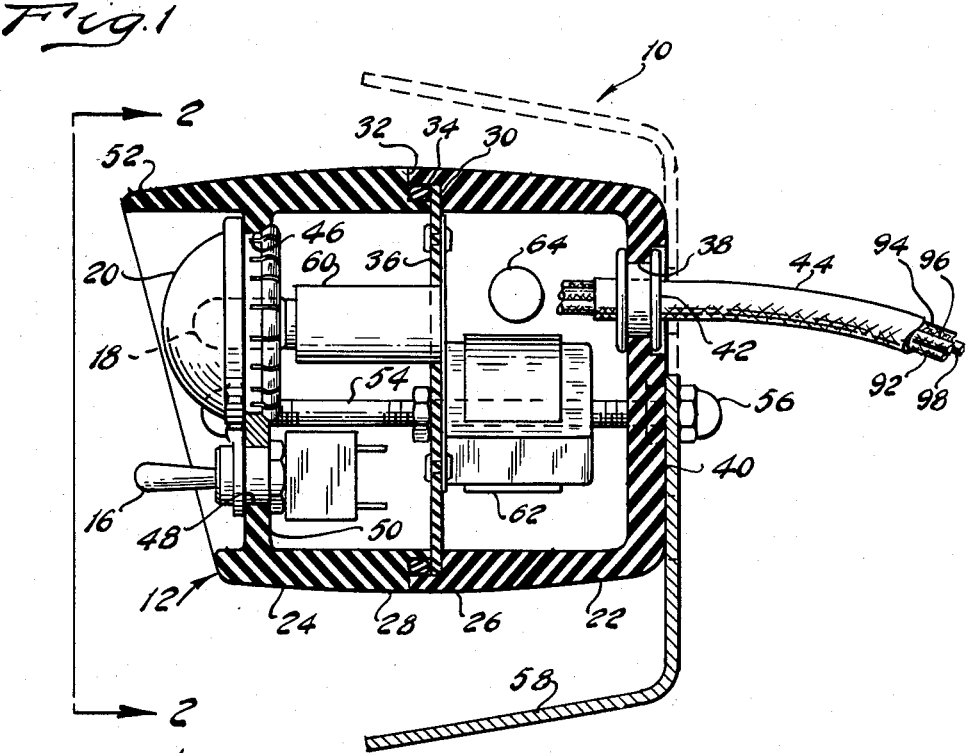
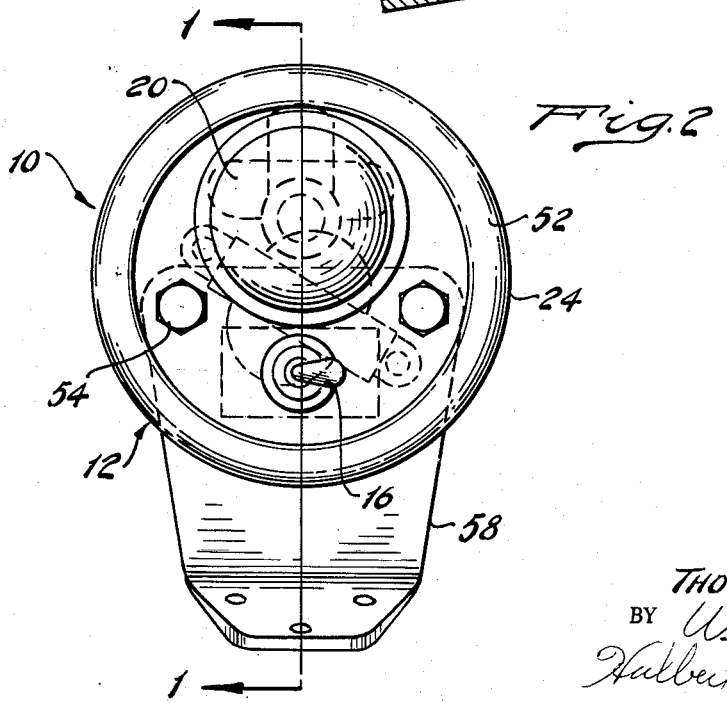
INVENTOR.
THOMAS N. KELLY
BY Whittemore
Hulbert & Belknap
ATTORNEYS Aug. 25, 1964  T. N. KELLY  3,146,435

SYNCHRONIZATION INDICATOR

Filed Nov 20, 1961  2 Sheets-Sheet 2

INVENTOR.
THOMAS N. KELLY
BY Whittemore
Hulbert & Belknap
ATTORNEYS

United States Patent Office 3,146,435
Patented Aug. 25, 1964

3,146,435
SYNCHRONIZATION INDICATOR
Thomas N. Kelly, Detroit, Mich., assignor to Aircraft Precision Products, Inc., Oak Park, Mich., a corporation of Michigan
Filed Nov. 20, 1961, Ser. No. 153,655
9 Claims. (Cl. 340—268)

The present invention relates to indicating apparatus and refers more specifically to apparatus for selectively providing an indication of the synchronous operation of a plurality of internal combustion engines or similar devices having members rotatable at a speed proportional to the speed of the devices without disturbing the operating characteristics of the devices.

It is often desirable in the operation of aircraft, boats and other devices having multiple power sources including members rotating at a speed proportional to the speed of operation of the individual power sources such as provided in internal combustion engines to synchronize the speed of operation of the power sources. It is therefore also desirable in such devices to provide means for indicating to an operator when the members are rotating at synchronous speeds.

Means for indicating synchronous rotation of members have been provided in the past. However, prior means for indicating the synchronous rotation of members of internal combustion engines or like devices deriving operating power and speed sensing signals from an electric ignition system associated with the devices have been deficient in that they have adversely effected the electric ignition system during operation. Further many of the previously provided indicating means have not been selectively operable without disturbing the operation of the ignition system. Also, prior synchronization indicators have often lacked the requisite simplicity of construction and efficiency in providing a readable indication.

It is therefore an object of the present invention to provide an improved rotational speed synchronization indicator.

Another object is to provide an engine rotational speed synchronization indicator for use in conjunction with engine electric ignition system which produces a minimum effect on the operating characteristics of the electric ignition systems.

Another object is to provide an engine rotational speed synchronization indicator which may be selectively operated without interrupting operation of the engines with which it is associated.

Another object is to provide an engine rotational speed synchronization indicator wherein a visual indication is provided by means of a high intensity neon bulb positioned adjacent a Fresnel lens.

Another object of the invention is to provide an engine rotational speed synchronization indicator for a pair of internal combustion engines having the usual electric ignition system including a transformer having a separate low inductance primary winding in series between the ignition switch and ignition coil of the electric ignition circuit of each of the motors to be synchronized and a secondary winding in parallel with the terminals of a light bulb.

Another object is to provide a synchronization indicator as set forth above and further including switch means for selectively shorting the transformer primary windings out of the ignition circuits without breaking the ignition circuits.

Another object is to provide engine synchronization indicator apparatus as set forth above which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a longitudinal section view of an engine synchronization indicator constructed in accordance with the invention and taken substantially on the line 1—1 in FIGURE 2.

FIGURE 2 is an end view of the engine synchronization indicator illustrated in FIGURE 1 taken in the direction of arrows 2—2 in FIGURE 1.

One embodiment of the present invention will now be disclosed in detail.

Figure 3:
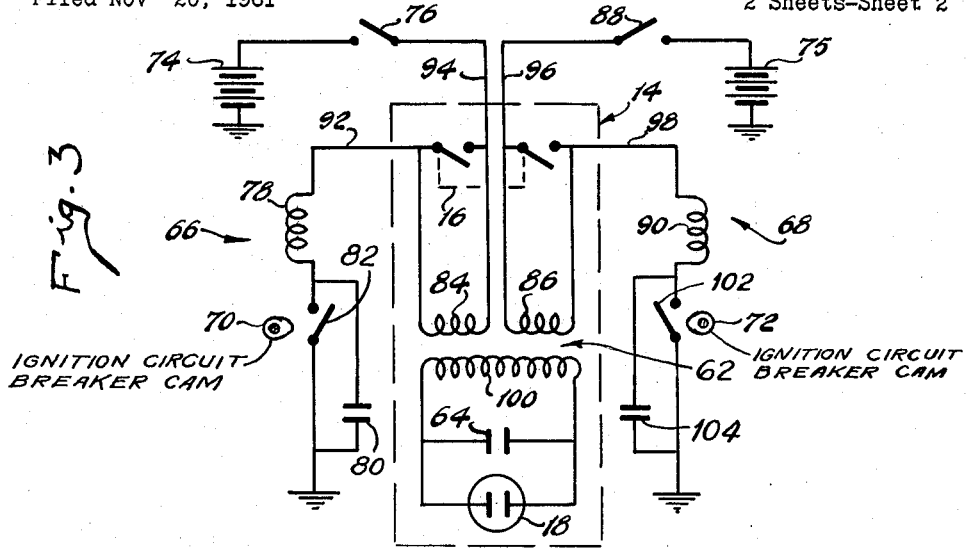
FIGURE 3 is a schematic diagram of the engine synchronization indicator illustrated in FIGURES 1 and 2.

In accordance with the invention the engine synchronization indicator 10 includes the mounting structure 12 shown best in FIGURES 1 and 2 for the electric circuit 14 illustrated within the dashed line in FIGURE 3.

In operation closing of the switch 16 will produce intermittent illumination of the lens 20 by the bulb 18 at a rapid rate if the engines to which the synchronization indicator 10 is connected are rotating at substantially different speeds. As the speed of rotation of the engines approach synchronous speed the illumination of the lens 20 by the bulb 18 will become progressively more intermittent until at exact synchronization of the engines the lens 20 will appear to be continuously illuminated.

More specifically the mounting structure 12 includes the cup shaped housing parts 22 and 24 which, as shown in FIGURE 1, have open ends 26 and 28 respectively. The open ends 26 and 28 of the housing members 22 and 24 are provided with annular recesses 30 and 32 respectively to receive the annular sealing ring 34 and the periphery of the electrical mounting chassis 36 therebetween. The housing members 22 and 24 are molded of plastic insulating material, such as a phenolic.

The housing member 22 is provided with an opening 38 extending through the end 40 thereof formed as shown in FIGURE 1. A grommet 42 is secured within the opening 38 to seal the opening between the housing part 22 and the electric cable 44 extending from the engines the synchronization of which is to be indicated by the synchronization indicator 10.

The other housing part 24 includes openings 46 and 48 extending through the end 50 thereof. The Fresnel lens 20 is removably secured in the opening 46 as shown best in FIGURE 1. The double pole single throw switch 16 is secured in the opening 48. Housing part 24 further includes the annular flange 52 on the end 50 thereof surrounding the lens 20 to shade the lens for increasing the daylight visibility of the engine synchronization indicator 10.

The two body parts 22 and 24 are secured together in assembly as shown best in FIGURE 1 by means of a pair of elongated studs 54 extending therethrough and the associated nuts 56. Studs 54 and nuts 56 further operate to secure the mounting bracket 58 to the housing part 22 in either the position illustrated in solid lines in FIGURE 1 or alternatively in the position illustrated in dotted lines in FIGURE 1. Thus the mounting structure 12 may be selectively mounted on top of a member having a desired horizontal surface or suspended from the bottom thereof by bracket 58.

The electrical mounting chassis 36 provides mounting means for the bulb socket 60, transformer 62 and condenser 64 of the engine synchronization indicator 10. The bulb socket 60 is entirely conventional and will not therefore be considered in detail. The transformer 62 and condenser 64 will be considered in greater detail with regard to the schematic diagram of the engine synchronization indicator 10 of FIGURE 3.

The schematic diagram of FIGURE 3 includes a partial showing of ignition circuits 66 and 68 of a pair of internal combustion engines including the rotating cam members 70 and 72. Inasmuch as the ignition circuits are conventional only one circuit will be considered in detail. Further it will be understood that both ignition circuits may be operated from a single source of electric energy rather than from separate batteries 74 and 75.

The ignition circuit 66 besides including the battery 74 includes the usual ignition switch 76, the primary winding 78 of the usual ignition coil, the usual capacitor 80 and the breaker 82 adapted to be periodically opened and closed on rotation of the cam 70 at a speed proportional to the speed of the engine with which the cam is associated. The ignition elements as shown in FIGURE 3 are connected in series in the usual manner.

In accordance with the invention an engine synchronization indicator including the transformer 62, capacitor 64, the high intensity neon bulb 18 and the double pole single throw switch 16 is connected in the ignition circuits 66 and 68 as shown in FIGURE 3. The transformer 62 includes a pair of low direct current resistance primary windings 84 and 86 and has a high, voltage step-up turns ratio such for example as one hundred to one.

The primary winding 84 of the transformer 62 is connected in series in the ignition circuit 66 between the ignition switch 76 and the primary winding 78 of the ignition coil while the primary winding 86 of the transformer 62 is connected in series in the ignition circuit 68 between the ignition switch 88 and the primary winding 90 of the ignition coil. Further the double pole single throw switch 16 is so connected that on movement of the switch into a closed position both primary windings of the transformer 62 are shorted out of the ignition circuits while on opening of the switch 16 the primary windings 84 and 86 of the transformer 62 are placed in series as previously indicated in the ignition circuits 66 and 68.

Referring particularly to the schematic diagram of FIGURE 3 it will be noted that the electronic portion of the engine synchronization indicator may be placed in the electric ignition circuits 66 and 68 with only the four connections provided by conductors 92, 94, 96 and 98. The engine synchronization indicator 10 may therefore be remotely located with respect to the ignition circuits with which it is associated.

The operation of the engine synchronization indicator 10 will be considered in conjunction with the graphs of FIGURES 4-7. Thus with the engines to be synchronized in operation and with the switch 16 in a closed position so that the primary windings 84 and 86 of the transformer 62 are shorted out of the ignition circuits 66 and 68 the engine synchronization indicator of the invention will have no material effect on the operation of the engines associated with the ignition circuits 66 and 68.

Figure 4:
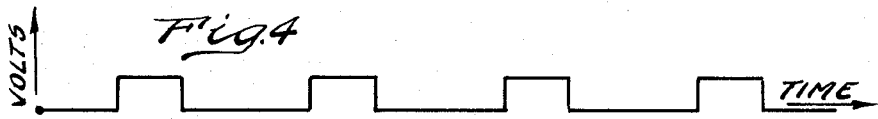
FIGURE 4 is a graphical representation of typical voltage applied to a primary winding of the engine synchronization indicator transformer.

When it is desired to provide an indication of the synchronization of the engines with which the engine synchronization indicator 10 is connected the switch 16 is opened to provide periodic voltage pulses through the primary windings 84 and 86 of the transformer 62 such as shown in FIGURE 4 which voltage pulses occur at a rate proportional to the speed of the engines with which the ignition circuits 66 and 68 are associated and which therefore are either synchronized or out of synchronization in accordance with the synchronization of the engines.

Figure 5:
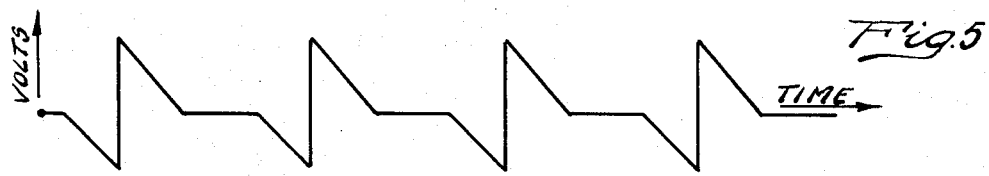
FIGURE 5 is a graphical representation of the voltage induced in the secondary winding of the engine synchronization indicator illustrated in FIGURES 1-3 due to a voltage similar to that illustrated in FIGURE 4 applied to one of the primary windings of the engine synchronization indicator transformer.
Figure 6:
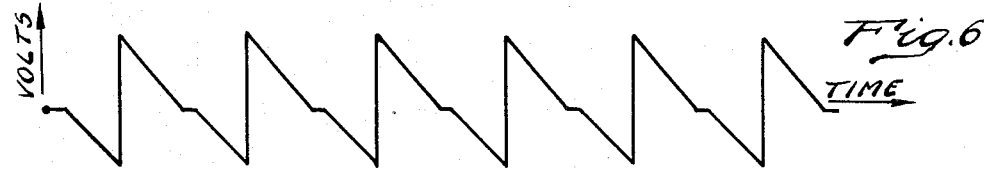
FIGURE 6 is a graphical representation of the voltage induced in the secondary winding of the transformer of the engine synchronization indicator illustrated in FIGURES 1-3 by a voltage similar to but not of the same frequency as that of FIGURE 4 applied to the other primary winding of the transformer of the engine synchronization indicator.

Pulses such as those illustrated in FIGURE 4 of different frequency due to non synchronous engine operation when applied to the primary windings 84 and 86 of the transformer 62 will produce voltage pulses in the secondary winding 100 of the transformer 62 which are represented by the voltages shown in FIGURES 5 and 6.

Due to the provision of the low impedance primary windings of the transformer 62 in series with the primary windings 78 and 90 of the ignition coils in the location shown in FIGURE 3 in the ignition circuits 66 and 68, the high voltages indicated in FIGURES 5 and 6 occur as the breakers 82 and 102 are closed rather than when the breakers are first opened. Therefore, with the construction of the invention the firing characteristics of the ignition circuits 66 and 68 are not appreciably effected by the synchronization indicator as they are with synchronization indicators wherein primary windings such as 84 and 86 are of relatively high impedance and are in parallel with the ignition coils 78 and 90 or wherein the primary coils 84 and 86 are connected between the condensers 80 and 104 and ground.

Figure 7:
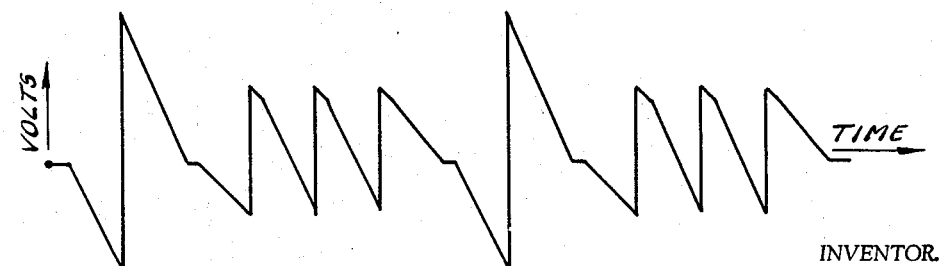
FIGURE 7 is a graphical representation of the combined voltage induced in the secondary winding of the transformer of the engine synchronization indicator illustrated in FIGURES 1-3 by the voltages shown individually in FIGURES 5 and 6.

The pulses of voltage in the secondary winding 100 of transformer 62 as shown in FIGURES 5 and 6 when combined provide a combined voltage across the transformer secondary winding 100 as illustrated in FIGURE 7. Thus, as shown, every second pulse produced by the ignition circuit providing the voltage pulses illustrated in FIGURE 5 and every third pulse of the voltage shown in FIGURE 6 will add to produce a large voltage across the secondary winding 100 of the transformer 62 sufficient to fire the high intensity neon bulb 18. Capacitor 64 serves to prevent firing of the neon bulb 18 by the intermediate smaller voltage pulses.

Thus it will be seen that if the engines having ignition circuits 66 and 68 are operating at the same speed the voltage pulses in the primary windings 84 and 86 of the transformer 62 will be identical and in the form illustrated in FIGURE 4. Similarly at synchronization the voltages produced by the primary windings 84 and 86 in the secondary winding 100 of the transformer 62 will be synchronized and thus illuminate the neon bulb 18 for each voltage pulse through the primary coils 84 and 86. Such frequent illumination of the bulb 18 will appear as a constant illumination thereof.

If the motors having the ignition circuits 66 and 68 are very close to being synchronized the period between voltages induced in the secondary winding 100 of the transformer 62 due to voltage pulses through the primary windings 84 and 86 which will add to produce the voltage necessary to fire the neon bulb 18 will be relatively long so that lighting of the bulb will be intermittent and infrequent, with engines progressively more out of synchronization the frequency at which pulses occur in the secondary winding 100 of the transformer 62 which will add to produce the necessary voltage to fire the neon bulb 18 will become progressively greater so that with engines badly out of synchronization the neon bulb 18 will be turned on and off rapidly.

After it has been determined that the engines are synchronized or if it is determined they are not synchronized and they have been brought into synchronization if desired the switch 16 is again opened since it is undesirable to have the neon bulb 18 constantly lit. With the circuit construction shown in FIGURE 3 in conjunction with the low impedance primary coils 84 and 86 of the transformer 62 such opening and closing of the switch 16 does not detrimentally effect the usual operation of the ignition circuits 66 and 68 contrary to many previous constructions wherein switching of the indicator either on or off required the complete breaking and remaking of the ignition circuits.

While only one embodiment of the present invention has been described in detail other embodiments and modifications thereof will be suggested from the foregoing disclosure. It is the intention to include all such embodiments and modifications of the invention within the scope of the invention which is indicated by the appended claims.

What I claim as my invention is:

1. Apparatus for indicating synchronization of a pair of engines which engines have separate ignition circuits including a source of electric energy, an ignition switch, an ignition coil primary winding and an ignition condenser in series, comprising a pair of generally cup-shaped members having adjacent open ends, one of which has an opening therethrough, a seal and an electrical chassis positioned between the open ends of the cup-shaped members, stud and nut means extending axially through said cup-shaped members for securing said cup-shaped members, seal and chassis in assembly, a separate transformer primary winding secured to said chassis and in series with each ignition circuit between the ignition switch and ignition coil primary winding, a single transformer secondary winding also secured to said chassis and operably associated with both said transformer primary windings, a lens in the opening in said one cup-shaped number and an indicator light positioned adjacent said lens and connected across the transformer secondary winding for energization thereby on occurrence of simultaneous energy pulses in the transformer primary windings.

2. In indicating apparatus an insulating housing including a pair of generally cup-shaped members having adjacent open ends, a seal and an electrical chassis positioned between the open ends of the cup-shaped members, stud and nut means extending axially through said cup-shaped members for securing said cup-shaped members, seal and chassis in assembly, one of said cup-shaped members including an opening therethrough, indicator means in said opening and means for actuating said indicator means secured to said chassis.

3. Structure as claimed in claim 2 wherein said indicating apparatus further includes an annular light shield around the opening in said one of the cup-shaped members to improve the daylight visibility of the indicator means.

4. Structure as claimed in claim 2 wherein said indicator means includes a Fresnel lens in the opening and a high intensity neon bulb positioned within the housing adjacent the lens.

5. Structure as claimed in claim 2 wherein said indicating apparatus further includes a selectively positionable mounting bracket secured to the other cup-shaped member by said stud and nut means.

6. In indicating apparatus a housing including a pair of generally cup-shaped members having adjacent open ends, an electrical chassis positioned between the open ends of the cup-shaped members, means extending axially through said cup-shaped members for securing said cup-shaped members and chassis in assembly, an indicator secured to one of said cup-shaped members and means secured to said chassis for actuating said indicator.

7. Apparatus for indicating synchronization of a plurality of engines which engines have substantially separate ignition circuits comprising an insulating housing including a pair of generally cup-shaped members having adjacent open ends, an electrical chassis positioned between the open ends of the cup-shaped members, means extending axially through said cup-shaped members for securing said cup-shaped members and chassis in assembly, indicator means secured to one of said cup-shaped members and means for actuating said indicator means secured to said chassis including a separate transformer primary winding electrically connected in series with each ignition circuit and a single transformer secondary winding operably associated with each of said transformer primary windings electrically connected to said indicator means.

8. Apparatus for indicating synchronization of a plurality of engines having separate ignition circuits each including a source of electrical energy and an ignition coil primary winding in series with an ignition breaker and an ignition condenser, comprising a pair of generally cup-shaped members having adjacent open ends, an electrical chassis positioned between the open ends of the cup-shaped members, means for securing said cup-shaped members together with the chassis clamped between the open ends of the cup-shaped members, a separate transformer primary winding connected in series in each ignition circuit and secured to the electrical chassis, a single transformer secondary winding also secured to said chassis and operably associated with all of said separate transformer primary windings and an indicator for indicating synchronization of said engines connected across the transformer secondary winding for energization thereby on occurrence of simultaneous energy pulses in the separate transformer primary windings.

9. Structure as set forth in claim 8 and further including switch means connected across said separate transformer primary windings for selectively shorting all of said separate transformer primary windings out of the ignition circuits without breaking the ignition circuits.

References Cited in the file of this patent

UNITED STATES PATENTS

| | | |
|---|---|---|
| 1,671,680 | Muelheim et al. | May 29, 1928 |
| 2,118,843 | Woodman | May 24, 1938 |
| 2,164,588 | McRae et al. | July 4, 1939 |
| 2,205,169 | Hallman | June 18, 1940 |
| 2,294,515 | Senauk et al. | Sept. 1, 1942 |
| 2,425,081 | Bohannon | Aug. 5, 1947 |
| 2,492,296 | Koblas | Dec. 27, 1949 |